US012589517B2

(12) United States Patent
Krantz et al.

(10) Patent No.: US 12,589,517 B2
(45) Date of Patent: Mar. 31, 2026

(54) LUBRICATION MONITORING SYSTEM

(71) Applicant: HUSQVARNA AB, Huskvarna (SE)

(72) Inventors: Jacob Krantz, Lekeryd (SE); Joakim Samefors, Jonkoping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/729,675

(22) PCT Filed: Dec. 12, 2022

(86) PCT No.: PCT/SE2022/051169
§ 371 (c)(1),
(2) Date: Jul. 17, 2024

(87) PCT Pub. No.: WO2023/140759
PCT Pub. Date: Jul. 27, 2023

(65) Prior Publication Data
US 2025/0100174 A1     Mar. 27, 2025

(30) Foreign Application Priority Data

Jan. 21, 2022     (SE) .................................... 2250055-7

(51) Int. Cl.
*F16N 29/02*          (2006.01)
*B27B 17/12*          (2006.01)

(52) U.S. Cl.
CPC .............. *B27B 17/12* (2013.01); *F16N 29/02* (2013.01); *F16N 2210/33* (2013.01); *F16N 2250/08* (2013.01)

(58) Field of Classification Search
CPC ...... B27B 17/12; F16N 2250/08; F16N 29/02
See application file for complete search history.

(56) References Cited

U.S. PATENT DOCUMENTS 3,432,840 A  *  3/1969  Neapolitakis ......... G01F 23/247
                                                              340/622
3,922,658 A  *  11/1975  Harper .................. G01F 23/247
                                                              340/622

(Continued)

FOREIGN PATENT DOCUMENTS

CN          200984755 Y      12/2007
CN          101668617 A       3/2010

(Continued)

OTHER PUBLICATIONS

Level Switch K-5720, Switzer, 1299 K- 5720 / Rev.1Retrieved from :- http://switzerprocess.co.in/image/data/pdf/LevelSwitchesK-5720. pdf.

(Continued)

*Primary Examiner* — Michael A Riegelman
(74) *Attorney, Agent, or Firm* — Burr & Forman

(57)          ABSTRACT

The present disclosure relates to a lubrication monitoring system (15) configured to monitor a supply of lubricant in a hand-held cutting tool (1) having a cutting unit (3, 5). A lubricant tank (41) and a conduit (45) are configured to duct a flow of lubricant from the tank (41) to the cutting unit (3, 5). The lubrication monitoring system (15) comprises a heating element (29) and a sensor arrangement (31, 33), the heating element (29) being configured to heat the lubricant flow. The sensor arrangement comprises a first sensor (31) located at the flow, upstream of the heating element (29), and a second sensor (33) located at said flow, downstream of the heating element. The lubrication monitoring system outputs a monitoring signal based on a sensed temperature difference between the first and second sensors (31, 33).

5 Claims, 3 Drawing Sheets

(56) References Cited

U.S. PATENT DOCUMENTS

| | | | | |
|---|---|---|---|---|
| 4,354,183 A * | 10/1982 | Weeks | G01K 1/026 | |
| | | | | 374/E1.005 |
| 4,637,493 A * | 1/1987 | Ehlert | F16N 39/04 | |
| | | | | 184/6.26 |
| 4,802,555 A * | 2/1989 | Matsunaga | B27B 17/12 | |
| | | | | 184/55.1 |
| 5,182,720 A * | 1/1993 | Beck | F16N 29/02 | |
| | | | | 700/282 |
| 5,582,237 A * | 12/1996 | Miyano | B23Q 11/141 | |
| | | | | 165/47 |
| 7,596,998 B2 * | 10/2009 | Zimmermann | G01F 23/22 | |
| | | | | 73/295 |
| 10,800,066 B2 * | 10/2020 | Ferrari | B27B 17/12 | |
| 11,267,160 B2 * | 3/2022 | Bylund | B23D 59/04 | |
| 12,370,714 B2 * | 7/2025 | King | F16N 13/06 | |
| 2010/0043234 A1 * | 2/2010 | Pellenc | B27B 17/12 | |
| | | | | 30/515 |
| 2011/0089155 A1 * | 4/2011 | Lee | B23D 59/02 | |
| | | | | 219/442 |
| 2012/0247876 A1 * | 10/2012 | Kreutzkamper | F16N 7/385 | |
| | | | | 184/14 |
| 2017/0021523 A1 * | 1/2017 | Haney | B27B 17/12 | |
| 2017/0072584 A1 * | 3/2017 | Pellenc | B27B 17/02 | |
| 2017/0120471 A1 * | 5/2017 | Kawamura | B27B 17/12 | |
| 2019/0061028 A1 * | 2/2019 | Martinsson | A01G 23/083 | |
| 2019/0341660 A1 * | 11/2019 | Gurr | G07C 3/00 | |
| 2019/0353535 A1 * | 11/2019 | Bonac | G01K 13/08 | |
| 2020/0276661 A1 * | 9/2020 | Bylund | B23D 59/04 | |
| 2025/0100173 A1 * | 3/2025 | Samefors | H05B 1/0227 | |
| 2025/0100174 A1 * | 3/2025 | Krantz | B27B 17/12 | |

FOREIGN PATENT DOCUMENTS

| | | | |
|---|---|---|---|
| CN | 202805328 U | 3/2013 | |
| CN | 102152341 B | 6/2014 | |
| CN | 104574796 A | 4/2015 | |
| CN | 104574796 B | 11/2016 | |
| CN | 207841595 U | 9/2018 | |
| DE | 3436121 A1 | 5/1985 | |
| DE | 202004014254 U1 | 11/2004 | |
| DE | 202007017548 U1 | 5/2008 | |
| DE | 102015117027 A1 | 5/2016 | |
| DE | 102019103804 A1 | 8/2019 | |
| DE | 102019201532 A1 | 8/2020 | |
| EP | 0140844 A2 | 5/1985 | |
| EP | 0193322 A2 | 9/1986 | |
| EP | 0793910 A1 | 9/1997 | |
| EP | 1961529 A1 | 8/2008 | |
| EP | 2353779 A1 | 8/2011 | |
| EP | 3009243 A1 | 4/2016 | |
| EP | 3162519 A1 | 5/2017 | |
| FR | 2415721 A1 | 8/1979 | |
| IN | 20090031614 A | 8/2010 | |
| JP | H11-271126 A | 10/1999 | |
| JP | 2004-347396 A | 12/2004 | |
| JP | 2004-347500 A | 12/2004 | |
| JP | 2005-257616 A | 9/2005 | |
| JP | 2007-282322 A | 10/2007 | |
| JP | 2012-032247 A | 2/2012 | |
| JP | 2012-207791 A | 10/2012 | |
| JP | 2014-215199 A | 11/2014 | |
| KR | 10-2074161 B1 | 2/2020 | |
| WO | 83/00765 A1 | 3/1983 | |
| WO | 2019/088891 A1 | 5/2019 | |
| WO | 2020/119730 A1 | 6/2020 | |
| WO | WO-2020160911 A1 * | 8/2020 | G01F 23/2921 |

OTHER PUBLICATIONS

"Thermistors in Single Supply Temperature Sensing Circuits," Bonnie C. Baker, Microchip Technology Inc, Retrieved from :-http://ww1.microchip.com/downloads/en/AppNotes/00685b.pdf.

"Improve System Reliability with Lubricant Flow Confirmation," Paul Conley, SKF & Canlong He, SKF, Retrieved from :-http://www.machinerylubrication.com/Read/29460/lubricant-flow-confirmation.

Swedish Search Report for Application No. 1751356-5 mailed May 18, 2018.

International Search Report and Written Opinion for International Application No. PCT/SE2018/051013 mailed Dec. 4, 2018.

International Preliminary Report on Patentability for International Application No. PCT/SE2018/051013 issued on May 14, 2020.

International Search Report and Written Opinion for International Application No. PCT/SE2022/051169 mailed Mar. 1, 2023.

Swedish office action for Application No. 2250055-7 mailed Sep. 8, 2022.

* cited by examiner

LUBRICATION MONITORING SYSTEM

TECHNICAL FIELD

The present disclosure relates to a lubrication monitoring system configured to monitor a supply of lubricant in a hand-held cutting tool having a cutting unit, a lubricant tank and a conduit configured to duct a flow of lubricant from the tank to the cutting unit, wherein the lubrication monitoring system comprises a heating element and a sensor arrangement, the heating element being configured to heat said flow.

BACKGROUND

One example of such a monitoring system is disclosed in WO-2019/088891-A1. A lubrication system includes a tank and a conduit ducting lubricant from the tank to a cutting unit of the cutting tool. There is provided a heating element and a control unit, the heating element heating a portion of the lubrication system and the control unit monitoring the supply of lubricant detecting by changes in temperature of the portion of the lubrication system.

One general problem with systems of this kind is to improve the reliability of the monitoring of the supply of lubricant.

SUMMARY

One object of the present disclosure is therefore to provide a lubrication monitoring system with improved reliability with regard to the monitoring of the supply of lubricant.

This object is achieved by means of a lubrication monitoring system as defined in claim 1. More specifically, in a lubrication monitoring system of the initially mentioned kind, the sensor arrangement comprises a first sensor located in the flow, upstream of the heating element, and a second one downstream of the heating element. The lubrication monitoring system outputs a monitoring signal based on a sensed temperature difference between the first and the second sensor. This provides a reliable monitoring of the lubricant flow, which is affected by changes in ambient temperature, for instance, only to a small extent.

The arrangement may comprise a sensor container forming a lubricant flow channel from an input to an output and a circuit board fitted inside the sensor container and carrying said heating element and said first and second sensors, reaching into the flow channel. This connects the heating element and the sensors to the lubricant flow in an efficient manner. The sensor container may further comprise a connector channel, separate from the flow channel, where cables connecting to the circuit board run.

Typically, the sensor container may be sealed on top of the circuit board by means of a molded resin.

The first and second sensors may be NTC resistors.

The present disclosure further considers a lubrication monitoring system configured to monitor a supply of lubricant in a hand-held cutting tool having a cutting unit, a lubricant tank and a conduit configured to duct a flow of lubricant from the tank to the cutting unit, wherein the lubrication monitoring system comprises a sensor arrangement, and outputs a lubrication monitoring signal to a control unit depending on the lubricant flow. The monitoring system is configured to output a lubrication monitoring signal in the form of a periodically varying voltage upon detection of a lubricant flow exceeding a predetermined threshold. This provides a reliable transfer of lubricant flow information as the absence of the periodically varying voltage can easily be detected at the control unit.

The control unit may be configured to detect a constant low voltage if the lubricant flow is insufficient, and a constant high voltage if the monitoring system becomes disconnected. This allows the control unit to distinguish between those two fault conditions.

The present disclosure further considers a hand-held cutting tool having a cutting unit, a lubricant tank and a conduit configured to duct a flow of lubricant from the lubricant tank to the cutting unit, the handheld cutting tool further comprising a lubrication monitoring device configured to monitor the lubricant flow. The lubricant tank comprises an outer recess, wherein the lubrication monitoring unit is located in the recess. This offers the possibility of producing a complete lubrication unit, which may be efficiently incorporated in an assembling line.

Typically, the lubrication monitoring unit may be fitted in the recess with a snap fit to facilitate assembling.

In any of the scenarios outlined above, the tool may typically be a battery-operated chainsaw.

DETAILED DESCRIPTION

Figure 1:
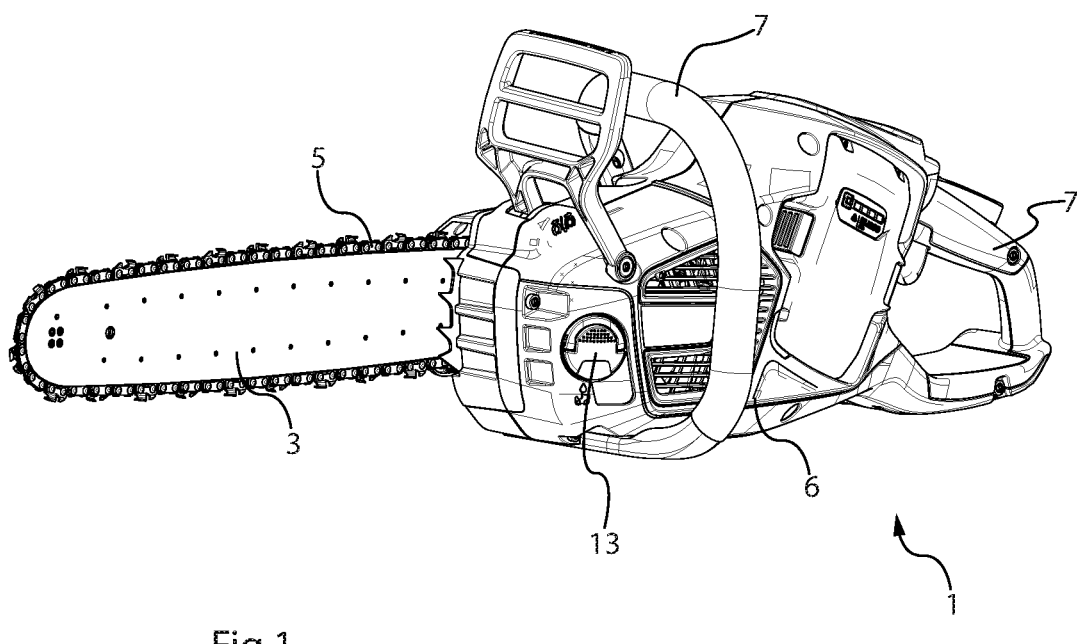
FIG. 1 shows a chain saw.

The present disclosure relates to a lubrication monitoring system for a chainsaw, and to a chainsaw comprising such a system. An example of a chain saw 1 is illustrated in FIG. 1. The chainsaw comprises a guide bar 3 on which a saw chain 5 runs, driven by a motor inside the chainsaw housing 6. The chainsaw is operated by a user holding the handles 7 thereof. In the illustrated case, the chainsaw is powered by a replaceable battery 8 secured in a battery compartment 10.

During operation, the saw chain 5 is lubricated by a steady but small flow of lubricant such as petroleum or vegetable oil, to ensure that the saw chain 5 runs smoothly on the guide bar 3 and that the individual saw chain links can pivot in relation to each other without significant friction. Oil is fed from a lubricant oil tank, the cap 13 of which is indicated in FIG. 1. The lubricant flow may be achieved by means of a pump operating based on the chainsaw motor speed providing a flow that varies slightly based on speed.

While the present disclosure in principle is applicable to both electric chainsaws and chainsaws driven by an internal combustion engine, ICE, it is particularly advantageous in relation to electric chainsaws, whether battery-operated or connected to a power outlet means of a cable. In ICE driven chainsaws the oil tank may be dimensioned such that the lubricant tank is almost empty at the same time as the petrol tank is empty, meaning that the skilled user may learn to replenish the supply of both fluids at the same time. In battery-operated saws on the other hand, the battery 8 usually needs to be replaced and/or recharged sooner, and even sooner as the battery ages. In power outlet powered saws, the saw can in principle be operated indefinitely. In electric saws, therefore there is no trigger to replenish the lubricant supply, and it may therefore be useful to monitor the lubricant flow and warn the user before the saw chain 5 runs dry. However, also in ICE-operated chainsaws, it may be useful to monitor the lubricant flow as it may be blocked by contaminations, for instance.

Figures 2A, 2B, 2C:
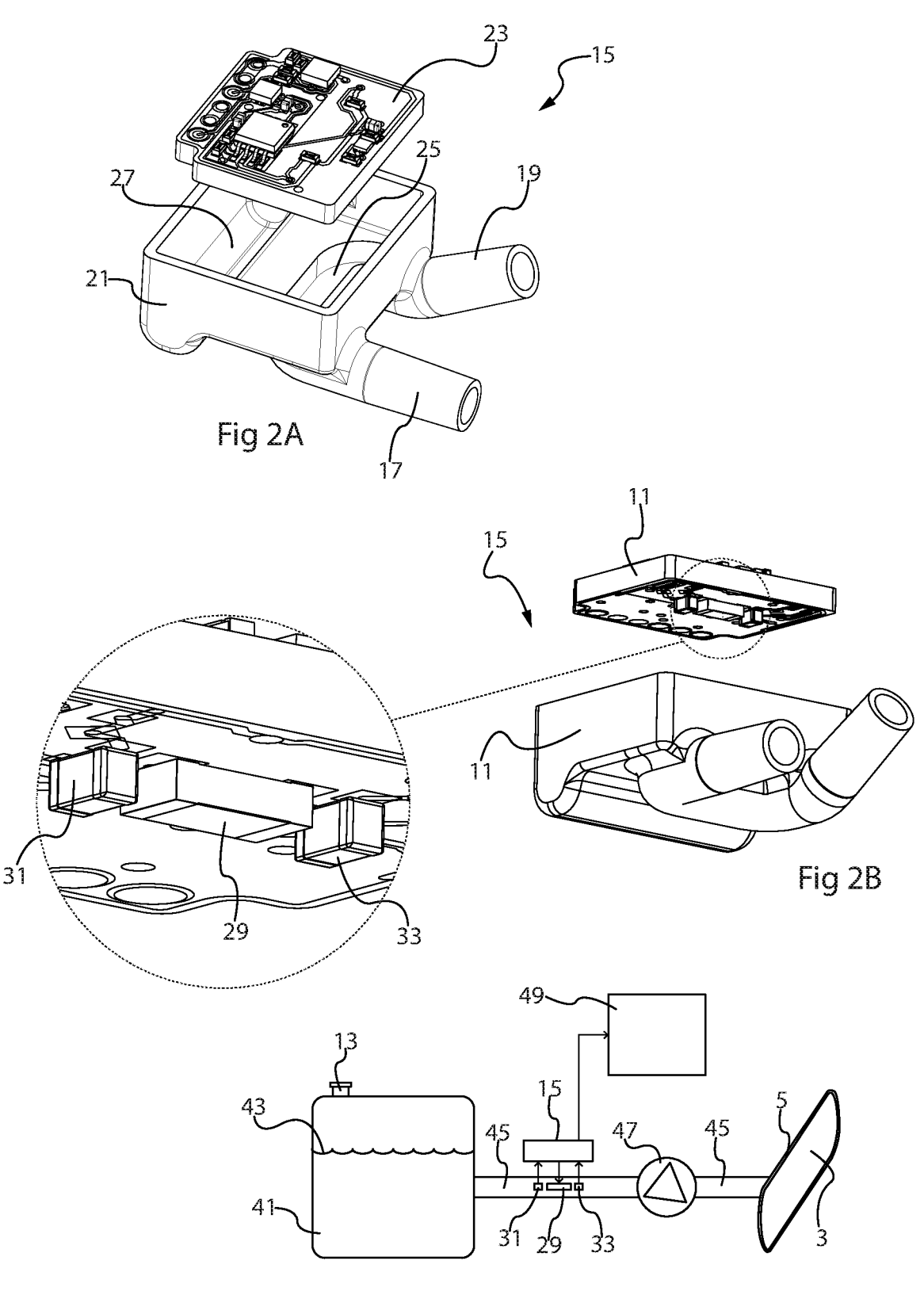
FIG. 2A shows a first exploded view of an oil sensor unit.
FIG. 2B shows a second exploded view of the oil sensor unit.
FIG. 2C illustrates schematically features of the oil sensor and the feeding of oil to a saw chain.

The present disclosure therefore describes an improved lubrication monitoring system which can be used in this context. FIG. 2A shows a first exploded view of a lubrication monitoring sensor unit 15. The sensor unit 15 comprises an inlet 17 to and an outlet 19 from a sensor container 21. In the sensor container 21, a circuit board 23 comprising an electric system is to be fitted. The sensor container 21 comprises a lubricant flow channel 25. When the circuit board 23 is fitted in the container 21, a closed passage is formed by the lubricant flow channel 25 from the container inlet 17 to the outlet 19.

The sensor container 21 further comprises a connector channel 27, separate from the flow channel 25, where cables connecting to the circuit board 23 can run. The sensor container 21 can typically be produced by injection mould-ing a plastic material. The sensor container 21 can further be closed by a lid, which is not shown in FIG. 2A, or the remaining space on top of the circuit board 23 may be filled with a molded resin to seal the interior of the container 21.

FIG. 2B shows a second exploded view of the lubrication monitoring sensor unit 15, where the bottom side of the circuit board 23 is exposed. The circuit board 23 includes, on the bottom side, a heating element 29, which reaches into the lubricant flow channel 25 to heat the lubricant therein as is best seen in the enlarged portion of FIG. 2B. This heating element 29 may in itself be useful for instance in very cold weather, where the viscosity of the lubricant may otherwise become too high be provided properly to the saw chain. Typically, the heating element 29 is a power resistor capable of producing about 0.5 W when powered by direct current at about 9 V.

The bottom side further comprises a first 31 and a second 33 temperature sensor, which also reach into the lubricant flow channel 25. In the lubrication flow, the first sensor 31 is located upstream of the heating element 29, and the second sensor 33 downstream of the heating element 29. Typically, the temperature sensors 31, 33 may comprise NTC resistors, which may be identical. However, the skilled person is aware of several other types of temperature sensors that are conceivable in this context such PTC resistors, RTD resistors, thermocouples, etc.

FIG. 2C illustrates schematically features of the lubrica-tion monitoring sensing arrangement and the feeding of lubricant to a saw chain 5 on a guide bar 3. There is provided a lubricant tank 41 containing a lubricant 43 that may be replenished through an opening covered by the cap 13 mentioned earlier. A conduit 45 connects the lubricant tank with the guide bar 3 at a location close to the saw chain 5. This conduit may include a plurality of tubes as will be shown. A lubricant pump 47, for instance comprising an impeller, feeds an amount of oil to the saw chain 5. As mentioned, one part of the lubricant conduit is made up of the lubrication monitoring unit 15, and the heating element 29 as well as the first and second temperature sensors 31, 33 reach into the lubricant flow.

As one sensor 31 is located upstream of the heating element 29 and the other 33 downstream thereof, the latter will sense a higher temperature if the there is a significant flow of lubricant through the conduit 45. The lubrication monitoring unit 15 may therefore output a monitoring signal which is based on a sensed temperature difference between the first and the second sensors 31, 33. The monitoring unit 15 may communicate with a chainsaw control unit 49 in a manner to be shown and may communicate an OK signal as long as the lubricant flow is acceptable, or may communi-cate an estimated lubricant flow or the temperature differ-ence itself, for instance.

As long as the lubricant tank 41 has a remaining amount of lubricant 43, the lubricant flow is not blocked and the lubricant pump 47 is working, there will be a significant temperature difference sensed in between the first and sec-ond sensors 41, 43. If this difference falls under a predeter-mined threshold however, it may be assumed that the saw chain lubrication is not sufficient. If so, a control system 49 to which the lubrication monitoring unit 15 is connected may produce a fault indication and/or disable or limit the operation of the saw to prevent damaging or degrading the saw chain 5 or other components of the chainsaw 1.

Compared to the initially mentioned known lubrication monitoring system where temperature changes are detected, this arrangement is influenced less by changes in ambient temperature, for instance, since changes in ambient tem-perature changes the temperature reading of both sensors alike and not the differential temperature. This provides an improved reliability.

Figure 3:
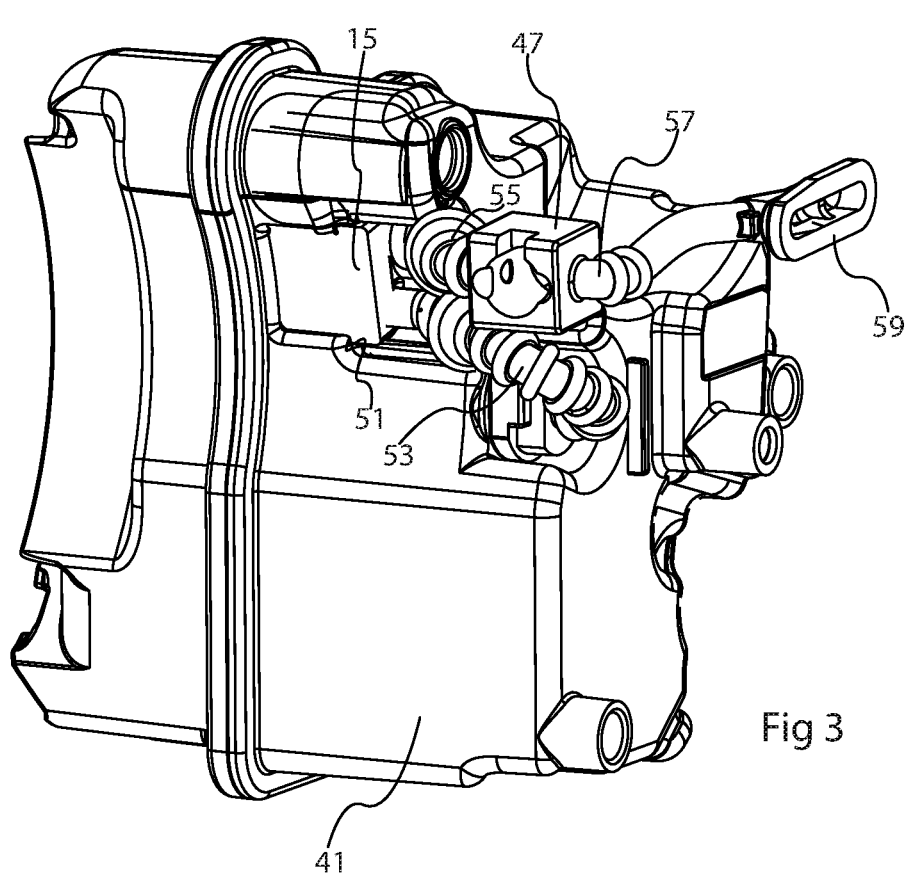
FIG. 3 shows the oil sensor attached to an oil tank.

FIG. 3 shows the lubrication monitoring sensor unit 15 attached to an oil tank 41. It has been found that it is advantageous to arrange the lubrication monitoring unit 15 together with the lubricant tank 41 as this simplifies pro-duction, maintenance, and repair of the chainsaw 1. In the present disclosure it is proposed to provide an outer recess 51 in the lubricant tank 41 which can be occupied by the lubrication monitoring unit 15. The lubricant tank 41 may for instance be formed from two pieces, both produced in plastic by injection moulding where the outer recess 51 is formed in one of those as a part of the mould.

As shown in FIG. 3, the lubricant conduit 45 may be formed by a first tube 53 connecting the lubricant tank 41 with the input 17 of the lubrication monitoring unit 15, a second tube 55 connecting the output 19 of the lubrication monitoring unit 15 to the lubricant pump 47, and a third tube 57 connecting the lubricant pump 47 with a nozzle 59 adapted to rest against the guide bar 3 of the chainsaw 1. Thus, as shown the lubricating system as a whole may be provided as an assembled unit.

Typically, there may be provided a form-fitting arrange-ment such that the lubrication monitoring unit 15 can be attached in the recess 51 of the lubricant tank 41 by being slid therein with a snap fit locking feature.

Figure 4A:
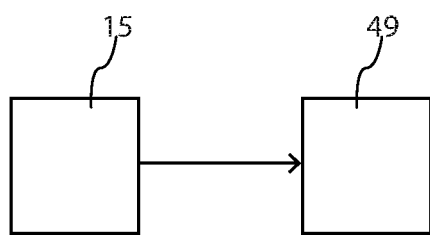
FIGS. 4A-D illustrate the oil sensor communicating with a control unit of the chain saw.
Figure 4B:
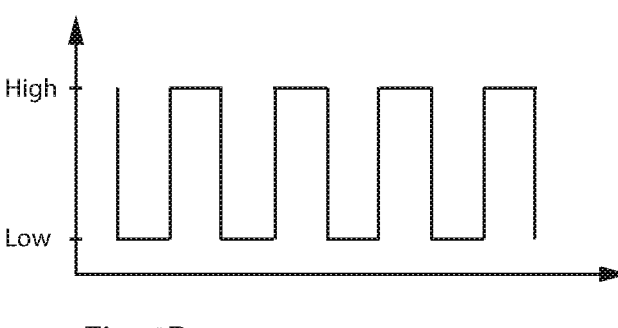
Figure 4C:
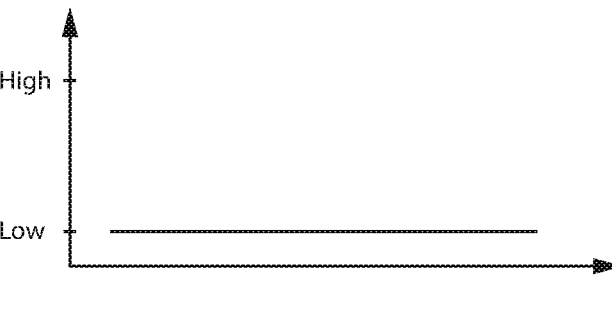

FIG. 4A illustrates the lubrication monitoring sensor 15 unit communicating with a control unit 49 of the chainsaw. In FIG. 4B it is illustrated that the lubrication monitoring sensor 15 has measured an acceptable lubricant flow and thus communicates an OK signal. This is done by providing an output to the control unit 49 which varies between a high and a low state in terms of voltage forming a square wave, for instance, using a switching circuit. When the lubricant tank 41 is empty, the flow disappears and the temperature difference between the sensors 31, 33 is no longer present due to the absence of a lubricant flow over the heating element 29. The lubrication monitoring sensor 15 then may output a constant low voltage, as illustrated in FIG. 4C, which is detected by the control unit 49 that may then for instance disable the chainsaw and provide a visual warning to the user, for instance using a user interface.

Figure 4D:
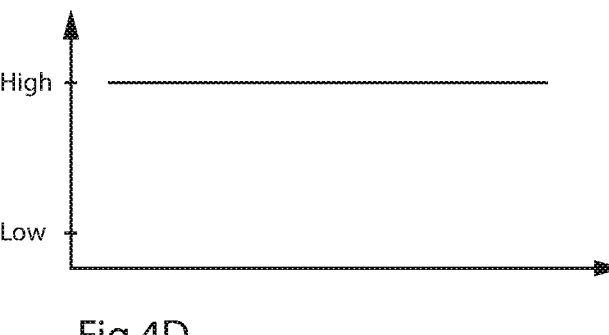

A third condition is illustrated in FIG. 4D where the lubrication monitoring sensor 15 has been disconnected or the cable in between the lubrication monitoring sensor 15 and the control unit 49 has become faulty. In that case for instance a pull-up resistor at the input of the control unit 49 may force the input to a constant high state which is detected as a fault indication by the control unit, which may for instance provide a visual warning using the user interface. Thanks to the above-described arrangement, the lubrication monitoring sensor 15 actively informs the control unit if the lubrication flow is sufficient and the latter is capable of detecting both insufficient flow and a faulty sensor connection with a very simple communications scheme. It would however be possible to apply other and more complicated communication protocols with the hardware shown in FIGS. 1-3 such as CAN (Controller Area Network) bus protocols or a protocol varying the switching frequency depending on the flow for instance.

The invention is not restricted to the described embodiments and may be varied and altered in different ways within the scope of the appended claims.

The invention claimed is:

1. A lubrication monitoring arrangement configured to monitor a supply of lubricant in a hand-held cutting tool having a cutting unit, a lubricant tank and a conduit configured to duct a flow of lubricant from the tank to the cutting unit, wherein the lubrication monitoring arrangement comprises a heating element and a sensor arrangement, the heating element being configured to heat said flow, wherein the sensor arrangement comprises a first sensor located at said flow, upstream of the heating element, and a second sensor located at said flow, downstream of the heating element, wherein the lubrication monitoring arrangement outputs a monitoring signal based on a sensed temperature difference between the first and the second sensor, and wherein the lubrication monitoring arrangement comprises a sensor container forming a lubricant flow channel from an input to an output and a circuit board fitted inside the sensor container and carrying said heating element and said first and second sensors, reaching into the flow channel.

2. The lubrication monitoring arrangement according to claim 1, wherein the sensor container further comprises a connector channel, separate from the flow channel, where cables connecting to the circuit board run.

3. The lubrication monitoring arrangement according to claim 1, wherein the sensor container is sealed on top of the circuit board by a molded resin.

4. The lubrication monitoring arrangement according to claim 1, wherein the first and second sensors are NTC resistors.

5. A battery-operated chainsaw comprising the lubrication monitoring arrangement according to claim 1.

* * * * *